(12) United States Patent
Gurgov (10) Patent No.: US 10,838,217 B2
(45) Date of Patent: Nov. 17, 2020

(54) LASER DIODE COLLIMATOR AND A PATTERN PROJECTING DEVICE USING SAME

(71) Applicant: INUITIVE LTD., Ra'anana (IL)

(72) Inventor: Hassid Costa Gurgov, Or Akiva (IL)

(73) Assignee: INUITIVE LTD., Ra'anana (IL)

( * ) Notice: Subject to any disclaimer, the term of this patent is extended or adjusted under 35 U.S.C. 154(b) by 98 days.

(21) Appl. No.: 15/616,053

(22) Filed: Jun. 7, 2017

(65) Prior Publication Data

US 2017/0351110 A1    Dec. 7, 2017

Related U.S. Application Data

(60) Provisional application No. 62/346,697, filed on Jun. 7, 2016.

(51) Int. Cl.
| | |
|---|---|
| *G02B 27/09* | (2006.01) |
| *G02B 19/00* | (2006.01) |
| *G02B 27/42* | (2006.01) |
| *G02B 13/00* | (2006.01) |

(52) U.S. Cl.
CPC ..... *G02B 27/0944* (2013.01); *G02B 19/0028* (2013.01); *G02B 19/0052* (2013.01); *G02B 27/095* (2013.01); *G02B 27/425* (2013.01); *G02B 13/007* (2013.01)

(58) Field of Classification Search
CPC .............. G02B 13/007; G02B 19/0028; G02B 19/0052; G02B 27/0944; G02B 27/095; G02B 27/425
See application file for complete search history.

(56) References Cited

U.S. PATENT DOCUMENTS

| | | | | |
|---|---|---|---|---|
| 5,515,468 | A * | 5/1996 | DeAndrea | G02B 6/4201 385/88 |
| 8,749,796 | B2 | 6/2014 | Pesach et al. | |
| 9,122,025 | B2 * | 9/2015 | Ishikawa | G02B 6/4292 |
| 9,273,846 | B1 | 3/2016 | Rossi et al. | |
| 2012/0038986 | A1 | 2/2012 | Pesach et al. | |
| 2013/0050800 | A1 * | 2/2013 | Maeda | B41J 2/465 359/290 |
| 2013/0258469 | A1 * | 10/2013 | Park | G02B 27/283 359/485.01 |
| 2013/0330230 | A1 * | 12/2013 | Uri | G01N 21/658 422/69 |
| 2016/0123561 | A1 * | 5/2016 | Chern | G02B 27/48 362/230 |

* cited by examiner

*Primary Examiner* — Joseph P Martinez
*Assistant Examiner* — Vipin Patel
(74) *Attorney, Agent, or Firm* — Bmwdy and Neimark, PLLC (57) ABSTRACT

An optical collimating unit is provided that comprises a laser unit, and a lens having three optical surfaces, being a first refractive surface, a second reflective surface and a third refractive surface. Also provided is a light projection device comprising an optical collimating unit that comprises a laser unit, a lens and an optical component configured to shape laser beams being emitted into respective desired light patterns.

18 Claims, 4 Drawing Sheets

LASER DIODE COLLIMATOR AND A PATTERN PROJECTING DEVICE USING SAME

TECHNICAL FIELD

The present disclosure generally relates to methods for using optical devices, and more particularly, to laser diode units and to devices configured to project patterns.

BACKGROUND

The main problems addressed by the present are compact optics for laser diode collimation and the projection of light patterns possibly at a wide Field of Illumination ("FOI"), i.e. a field having a wide angular illumination such as for example 120°, 160° or even higher, and the projection of two different patterns while using a single projecting module.

Today, light patterns are projected at high angles by using one of three methods that are known in the art, namely, a) special microstructured optical components designed for high angles, or b) by locating secondary components that follow a conventional projector, which increase the pattern's angular spread by stretching (e.g. by using a negative lens) or c) by locating secondary components that follow a conventional projector, which replicate (e.g. by using a diffractive optical element (DOE)) the original pattern over the required FOI.

A number of applications, including active 3D sensing systems (light-coding type and stereo), require projection of prescribed light patterns. Some applications, like consumer-electronics devices, require the pattern projector to have high performance (e.g. high output power, good contrast, high feature density), but at the same time to be a low-cost device which is energy-efficient and compact. These constraints make the use of lasers and micro-optical elements (such as microlenses and DOE) in pattern projectors to be an attractive solution. However, when the pattern projector is required to cover a wide angular range, diffractive and micro-optical components have quite a few drawbacks, among which are:

1. Having a limited angular coverage capability. Since the light deflection angle (of the incoming beam to the required edge of FOI) is inversely related to the size of features that should be applied to the micro-optical component (microlens array or DOE), the result is a requirement for special fabrication processes and reduced production yields associated therewith.
2. Complexity in the design, especially that of the DOEs. The commonly used assumption of a thin phase-mask holds only for relatively small FOI angles and for low aspect ratio (low-depth) features of the micro-optical component surface. Proper design and optimization of these components requires substantial computation capabilities and special algorithms, in order to successfully complete this task.
3. In some projectors, a second DOE (field multiplier) is used which replicates the pattern created by first DOE, in order to enable covering large FOIs. This leads to periodicity of the pattern (an undesired pattern property in 3D sensing), and special design features that need to be implemented if one were to avoid this drawback.
4. In some projectors, a negative lens is used in order to stretch a smaller-FOI pattern onto the desired larger FOI. Such a solution increases the size of the projector, making it unsuitable for space-limited applications, such as mobile devices.

A number of solutions have been suggested in the art in order to address the above problems. Some of these solutions are:

U.S. Pat. No. 9,273,846 describes an apparatus for producing structured light that comprises a first optical arrangement which comprises a microlens array having a multitude of transmissive or reflective microlenses which are regularly arranged at a lens pitch P and an illumination unit for illuminating the microlens array. The illumination unit comprises an array of light sources each having an aperture for emitting light at a wavelength L, wherein the apertures are located in a common emission plane located at a distance D from the microlens array. For the lens pitch P, the distance D and the wavelength L, the following equation applies $P^2=2LD/N$, where N is an integer substantially greater than 1.

High-contrast high-intensity light patterns can be produced. However, these devices generate patterns which are highly periodic, due to the physical principles used in the design. This periodicity presents a major limitation for using such a solution in depth sensing systems. To overcome the periodicity drawback, such modules are used in pairs which in turn require to have a precise orientation.

U.S. Pat. No. 8,749,796 discloses an optical apparatus that includes a beam source, configured to generate an optical beam having a pattern imposed thereon. A projection lens is configured to receive and project the optical beam so as to cast the pattern onto a first area in space having a first angular extent. A field multiplier is interposed between the projection lens and the first area and is configured to expand the projected optical beam so as to cast the pattern onto a second area in space having a second angular extent that is at least 50% greater than the first angular extent. However, this solution requires a rather complex design and the production of a customized light source (e.g. a vertical-cavity surface-emitting lasers (VCSEL) array).

US 20120038986 describes a pattern projector, comprising a light source, configured to emit a beam of light. A transparent substrate, which has a pair of mutually-opposed planar surfaces is configured to receive and propagate the beam within the substrate by total internal reflection between the planar surfaces. The transparent substrate comprises a diffractive structure that is formed on one of the planar surfaces and is configured to direct at least a part of the beam to propagate out of the substrate in a direction that is angled away from the surface and to create a pattern comprising multiple interleaved light and dark areas. However, the solutions suggested by this publication are quite impractical for commercial implementation.

Thus, in order to provide an adequate solution to enable projection of static light patterns and in particular at a wide FOI, a new approach is proposed by the present invention, one which overcomes the problems discussed hereinabove.

SUMMARY OF THE DISCLOSURE

The disclosure may be summarized by referring to the appended claims.

It is an object of the present disclosure to provide a compact optical device configured to collimate a possibly astigmatic light source, such as an edge-emitting laser diode.

It is another object of the present disclosure to provide a novel pattern projecting device which comprises a laser diode unit configured to emit light simultaneously from both ends of the laser chip.

It is another object of the present disclosure to provide a projector configured to project light patterns adapted for a wide field of illumination ("FOI").

It is another object of the present disclosure to provide a projector configured to project simultaneously two different patterns while using a single projecting module.

It is another object of the present disclosure to provide a projector configured to project two different patterns at different intensities.

Other objects of the present invention will become apparent from the following description.

Figure 2:
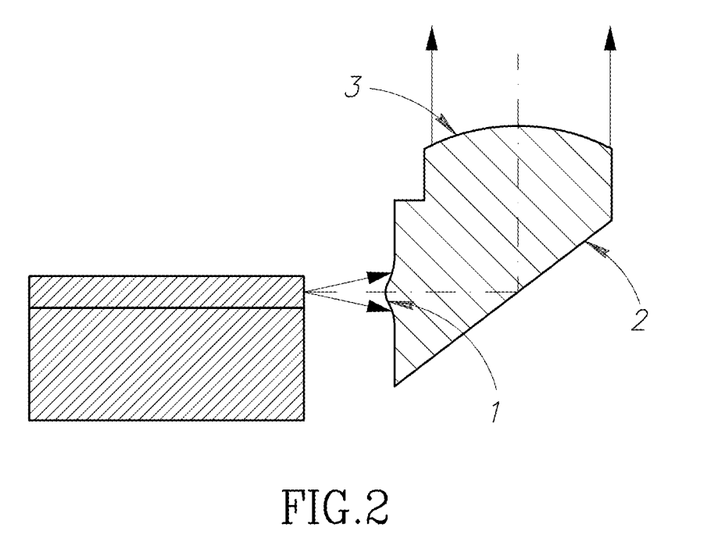
FIG. 2 illustrates a laser and lens according to an embodiment of the present invention.

According to an embodiment of the disclosure, there is provided an optical collimating unit that comprises a laser unit, and a lens having three optical surfaces, being a first refractive surface, a second reflective surface and a third refractive surface. An example of such an arrangement is illustrated in FIG. 2.

In accordance with another embodiment, any of the at least three optical surfaces, is a member selected from a group that comprises a convex surface, a concave surface, a spherical surface, an aspherical surface, a bi-conic surface, a cylindrical surface, a toric surface or a freeform shape, and wherein the shape of the at least three surfaces is selected to enable controlling a shape and direction of a beam refracted by the lens.

Reflection by the second surface may occur as a result of total internal reflection (TIR), in which case an uncoated surface may be used.

Alternatively, the surface may be provided with a metal or a dielectric reflective coating.

By another embodiment, the optical collimating unit further comprising an external reflective element, such as a small metal mirror, attached to the surface by using an adhesive material or any another applicable method which is known in the art per se. As a result of passing through such an optical arrangement, the emitted light beam may be shaped to the desired cross-section distribution of phase and amplitude, thereby the emitted light beam is focused at a desired distance from the lens. For a particular case of laser collimation, this distance may be very large when compared to the size of the module.

According to another aspect there is provided a light projection device comprising an optical collimating unit comprising at least one laser unit, at least one lens and at least one optical component configured to shape emitted laser beams into respective desired light patterns.

For example, the at least one optical component is selected from a group that consists of a phase-modulating component, such as a Diffractive Optical Element (DOE), a diffuser, or a microlens array (MLA). Such an optical collimating unit that comprises a lens and a pattern shaping element combined with a laser diode, serves as the optical part of a pattern projection module.

In yet another embodiment, the at least one optical component configured to shape emitted laser beams into respective desired light patterns, is implemented on (e.g. integrated with) one or more of the lens' surfaces, e.g. onto the third refractive (exit) surface.

According to another aspect of the disclosure, there is provided a pattern projecting device that comprises a laser diode unit having two separated apertures and configured to emit electromagnetic radiation simultaneously from both edges of that laser diode unit.

The term "laser unit" or "a laser diode unit" as used herein throughout the specification and claims is used to denote a device that emits light through a process of optical amplification based on stimulated emission of electromagnetic radiation. Such a laser diode may be for example an edge-emitting heterostructure laser, which commonly has an astigmatic light beam, i.e. a different aperture size and an angle of divergence of the two transversal axes of the beam. The laser may be installed in a package, housing or any other applicable structure.

According to another aspect of the disclosure, there is provided pattern projecting device that comprises an edge-emitting laser diode unit having at least two separated apertures and configured to emit electromagnetic radiation simultaneously from the at least two separated apertures of said laser diode chip.

In accordance with another aspect of the disclosure, there is provided a pattern projecting device (e.g. a projecting module) that comprises the above described laser unit, wherein the laser diode (e.g. chip) emits light from both its ends, and wherein said pattern projecting device comprises optical collimating units each fixed next to a respective end of the laser diode. Thereby, the same laser diode may serve two projection optical arrangements that may be used to project two different optical patterns.

According to another embodiment, the pattern projecting device comprises a plurality of surfaces each having a pre-defined curvature to enable collimating a fast axis and a slow axis of a light beam, and at least two microstructured components, each configured to generate a respective pattern out of a respective light beam that passes there-through.

According to still another embodiment, the projected light patterns are at least partially overlapping each other.

In accordance with another embodiment, the light patterns projected by the projector are spatially combined to provide a wide field of illumination subtending a wide angle of at least 90° in one or two transverse dimensions.

According to another embodiment, the projected light patterns are different from each other.

By still another embodiment, the projector further comprises a controlling element configured to adjust the amount of light directed to at least one of the projected light patterns.

In accordance with yet another embodiment, the adjustment of the amount of light is achieved by reflecting part of the light emitted via a respective aperture, back into the laser unit.

According to another embodiment, the optical power associated with the at least two light patterns is adjustable in a range that extends from providing an equal optical power to all projected light patterns derived from the electromagnetic radiation emitted simultaneously from the at least two separated apertures, to providing a near-zero optical power associated with one of the projected light patterns.

In accordance with still another embodiment, two controllable photonic devices associated with the projector, are each configured to adjust power transmitted from a respective end of the laser diode unit.

BRIEF DESCRIPTION OF THE DRAWINGS

For a more complete understanding of the present invention, reference is now made to the following detailed description taken in conjunction with the accompanying drawing wherein.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

Known patterns (e.g. grids or bars) are often projected by structured-light sensors or stereo sensors onto a scene. The deformation of these known patterns as it appears to the sensor camera when the pattern strikes surfaces, allows vision systems to calculate depth and surface information of the objects present in the scene, as used for example in structured light 3D scanners.

A pattern projector may comprise a light source, one or more optical components, and a package (housing). The purpose of this device is to project a light pattern. This typically may be achieved by manipulating light emitted from a source or an array of sources, and shaping it into the desired pattern at the desired intensity. In numerous projector modules, a laser or array of lasers are utilized, optionally a lens and a pattern-shaping element, a micro-structured optical element, such as a diffuser or DOE.

According to the present invention, the laser diode is preferably of an edge-emitter type, mounted on a surface ("laser substrate plane", usually a sub-mount substrate), which is perpendicular or nearly-perpendicular to the central axis of the desired pattern projection FOI.

Figure 1:
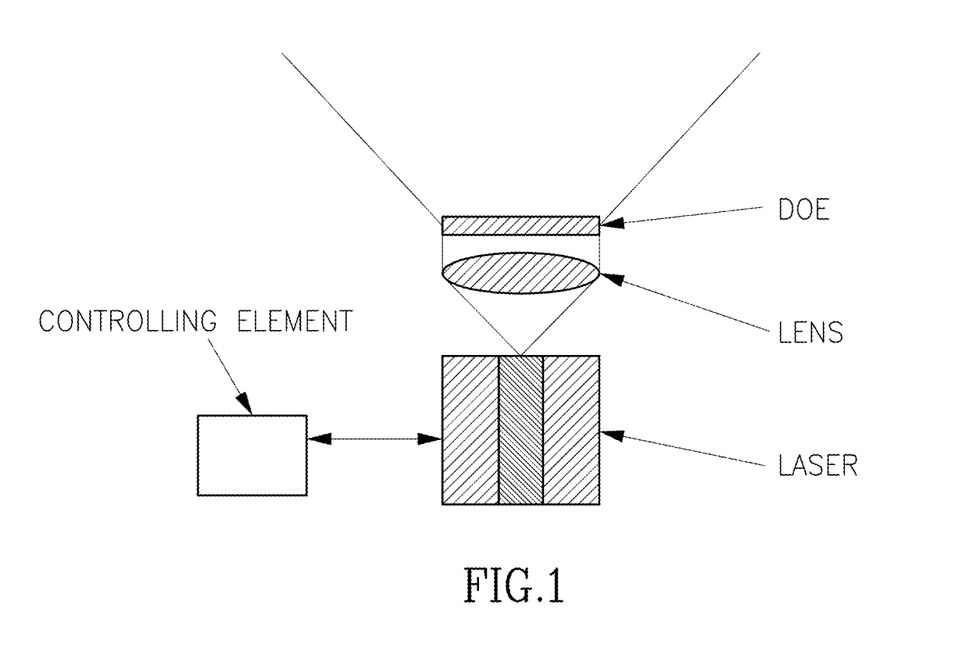
FIG. 1—illustrates an exemplary prior art single-sided projector.

FIG. 1 illustrates a prior art projector, being a conventional edge-emitting laser configured to emit light from only a single edge of the laser chip, while its opposite edge is configured not to emit light (e.g. by having a highly-reflective coating thereat. An optical component is placed next to the laser aperture at the appropriate location and alignment.

In the embodiment illustrated in FIG. 2, the purpose of the optical component placed next to the laser aperture is collimation of the laser diode light and folding it in the normal direction (or near-normal) to the laser substrate plane. To that end, the first surface (1) of the optical component is a cylindrical aspheric surface or a toroidal aspheric surface, and acts mainly on the fast axis of the laser diode beam. Its shape and distance from the laser aperture is chosen according to the desired beam size, which in turn is determined by DOE size in that direction. The second surface (2) folds the beam path, reflecting it in a direction which is normal or near-normal to the laser substrate surface. Surface (2) is a flat surface which reflects the light through total internal reflection (TIR), or by using a metallized or dielectric coating. In case of a dielectric coating—it may be used to filter additional wavelengths in the laser diode beam out of the optical path or combine them thereto. The third surface (3) is also an aspheric toroid or aspheric cylinder, and it collimates the slow axis of the laser beam. In this example, the optical component functions both as a collimating lens and as a folding mirror. This configuration is particularly useful for general laser-based devices which require compact laser collimator. In the case of using a compact pattern projector, after leaving the optical component, the beam passes through a microstructured component which forms the pattern.

Figure 3:
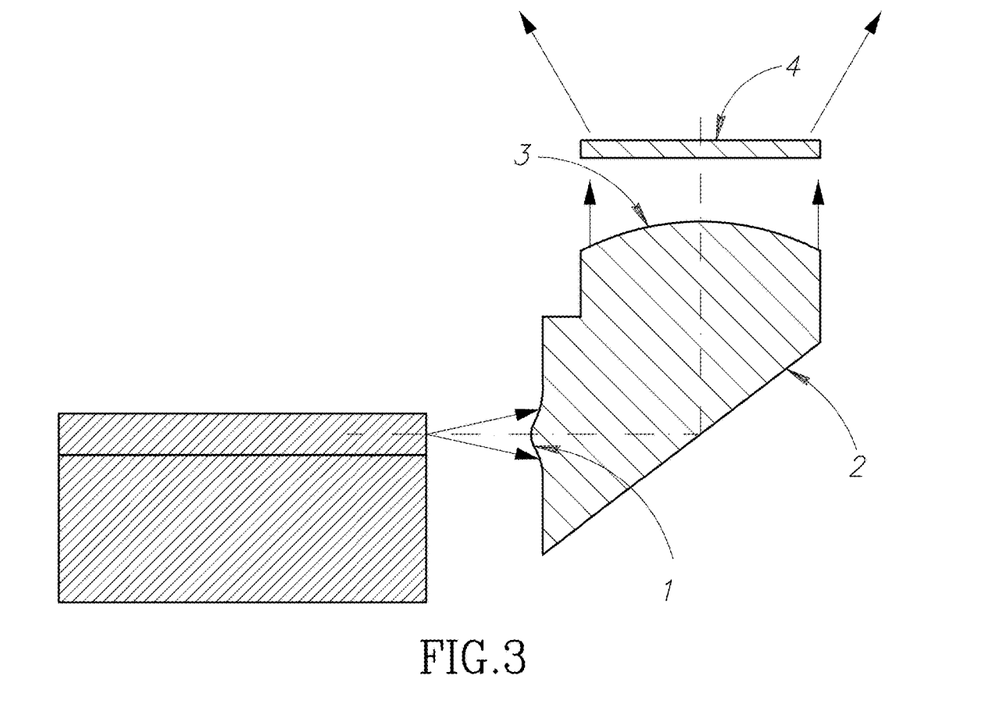
FIG. 3 exemplifies a single-sided projector construed according to an embodiment of the present invention.

In another example of the single-sided projector illustrated in FIG. 3, surface (1) collimates the fast axis, surface (2) is a curved surface which reflects the beam (again either by implementing TIR, or by using metal or dielectric coating or attaching a reflecting component) and collimates the slow axis. Surface (3) is a planar surface which emits the pre-conditioned (collimated) beam into the microstructured component (4).

By a further example of the single-sided projector illustrated in FIG. 3, but with the exception that the microstructure is integrated with surface (3) of the optical component, thereby effectively merging the two optical parts in the projector into a single one. In this example, the optical component has mainly three functions: collimating the beam, folding it and forming the pattern. This example is advantageous when compared with the previous single sided projectors described above, due to a lower Bill of Materials ("BOM") and assembly costs, precise alignment between microstructure and the other optical surfaces, improved thermo-mechanical and thermo-optic robustness, substantially smaller size and reduced power loss due to the fact that reflection at two surfaces has been eliminated.

By another example, the first surface collimates the slow axis of the laser beam and possibly also acts optically on the slow axis (such as to enable partial collimation of the beam), and the second surface is a curved surface with a relief pattern applied thereon, forming a curved diffractive surface. The surface is metallized, to provide adequate reflection. Same as in the previous example, the optical component serves as a folding prism, a collimator and a DOE.

By still another example, surface 1 is a flat surface. Surfaces 2 and 3 are curved and are configured to provide beam collimation.

Possible configurations of the three surfaces of the optical component are summarized in the following table:

| Configuration | Surface 1 | Surface 2 | Surface 3 |
|---|---|---|---|
| 1 | Curved, fast axis collimator | Flat | Slow axis collimator |
| 2 | Curved, fast axis collimator | Curved, slow axis collimator | Flat surface |
| 3 | Curved, fast axis collimator | Curved, slow axis collimator | Planar microstructure (DOE) |
| A | Curved, fast axis collimator | Curved microstructure; slow axis collimator and DOE | Flat Surface |
| 5 | Flat | Curved | Curved |

-continued

| Configuration | Surface 1 | Surface 2 | Surface 3 |
|---|---|---|---|
| | | optionally with microstructure | optionally with microstructure |

Figure 4:
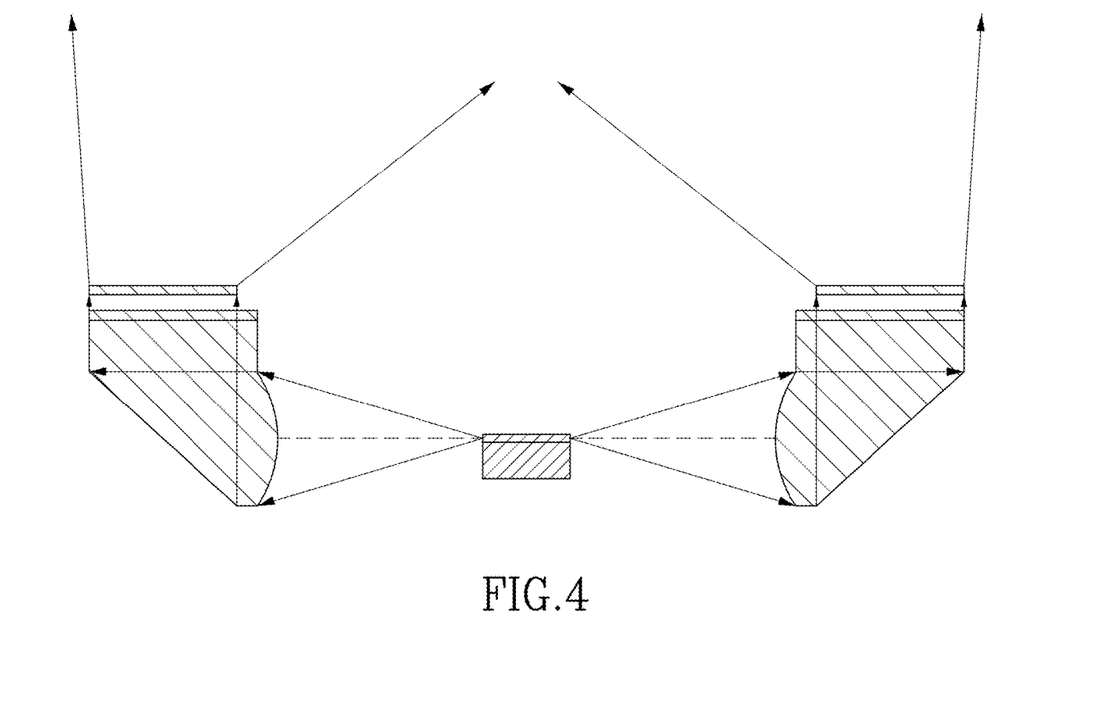
FIG. 4—illustrates a two-sided projector construed according to an embodiment of the present invention.

FIG. 4 illustrates an exemplary two-sided projector construed according to an embodiment of the present invention which is configured to project two patterns. In angular space, the projected patterns may completely or partially overlap each other, or in the alternative, may be non-overlapping. The optical layouts described in the above examples, are implemented at each end of the laser diode, thereby forming a pattern per each beam emitted from a respective end of the laser chip.

Figure 9:
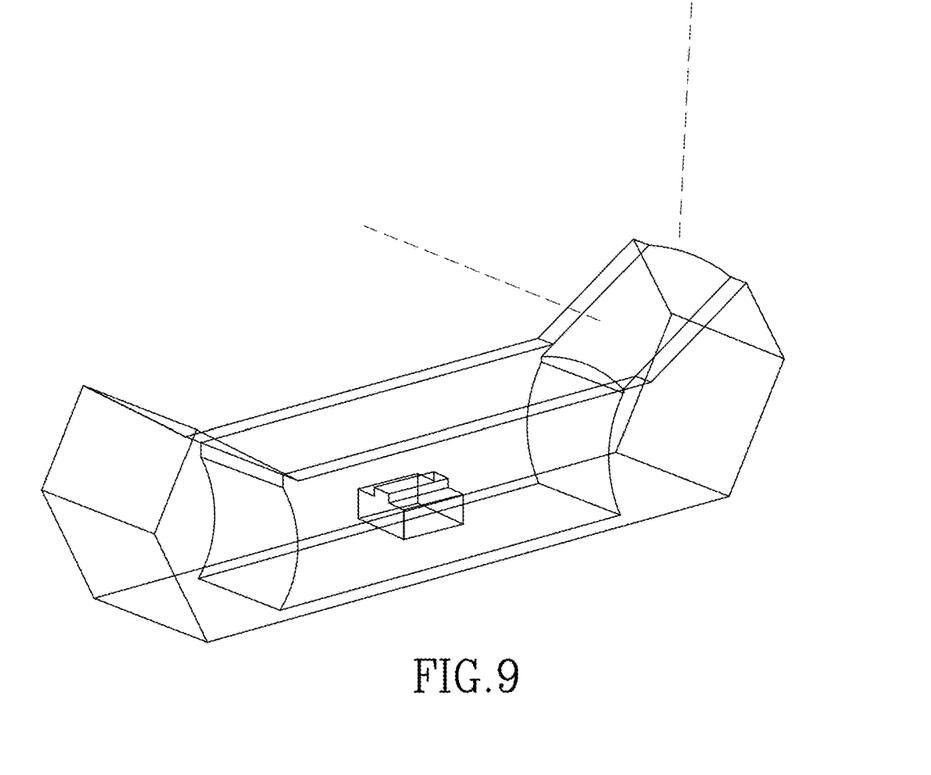
FIG. 9—exemplifies a double-sided projector construed according to another embodiment of the present invention.

In another example illustrated in FIG. 9, the optical components located at the two sides of the laser diode, may be manufactured as a single piece.

Figure 5:
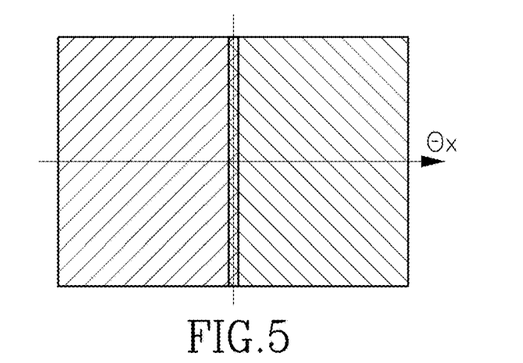
FIG. 5—exemplifies a Field of Illumination represented in angle space, and divided into two slightly-overlapping regions.

The FOI of the two-sided projector illustrated in FIG. 4 is divided into 2 slightly-overlapping regions, as shown in FIG. 5. The overall FOI illustrated in this figure, is $2*\theta x$ by $2*\theta y$, and if overlapping may be neglected, one side of the projector projects a pattern onto a respective part of the FOI, whose angular extent is from $(-\theta x_0)$ to 0 in the horizontal direction and $(-\theta y_0)$ to $\theta y_0$ in the vertical direction, whereas the other side of the projector projects the pattern associated therewith at the complimentary part of the FOI, namely, from 0 to $\theta x_0$ in the horizontal direction and from $(-\theta y_0)$ to $\theta y_0$ in the vertical direction.

Figure 6:
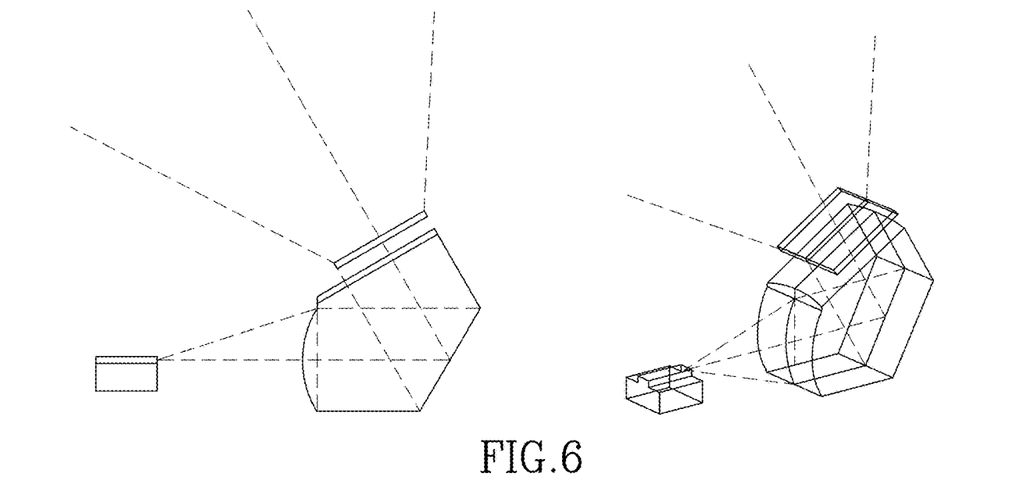
FIG. 6—exemplifies a slanted folding lens surface and accordingly slanted exit surface for projection of pattern into a tilted FOI.

Optionally, it may be advantageous to configure a design which implements the optical component with a different fold angle, where the beam within the component is folded not normally to the laser substrate surface but at a half of the $\theta x_0$ angle (or perhaps close to that value), while the exit surface (3) and the DOE are both slanted by $\theta x_0$ angle. Such an embodiment is illustrated in FIG. 6. In this example, the DOE creates a pattern which spans an angular space which is symmetric in both dimensions relative to the direction of the beam incident on the DOE.

Figure 7:
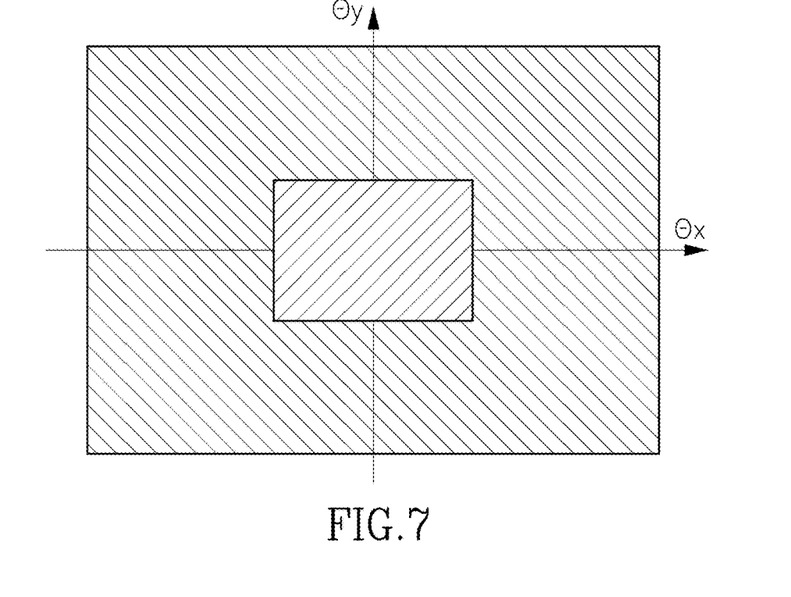
FIG. 7—exemplifies non-overlapping complementary projection areas presented in angle space.

In some applications, it may be of interest to separate the FOI into two different patterns which are symmetric around the FOI center, as illustrated in FIG. 7, and project either one of the patterns or both of them together. In this case, each side of the projector is aligned as shown in FIG. 3, i.e. the projection is done at both sides in a direction which is normal to the substrate surface plane. In such configurations, where the two DOEs are coplanar, they can be manufactured as a single unit. For the case illustrated in FIG. 7, one side of the projector includes a DOE which covers the central FOI, while the other side DOE projects a pattern which may include or not the central area (the central rectangle).

According to another embodiment of the present invention, one of the edges of the two-sided laser has a different coating from that of the other edge. Consequently, the total power of the laser is divided differently between its two ends. This may be useful sometimes, for example, in applications where the two projected patterns require different optical power levels.

Figure 8:
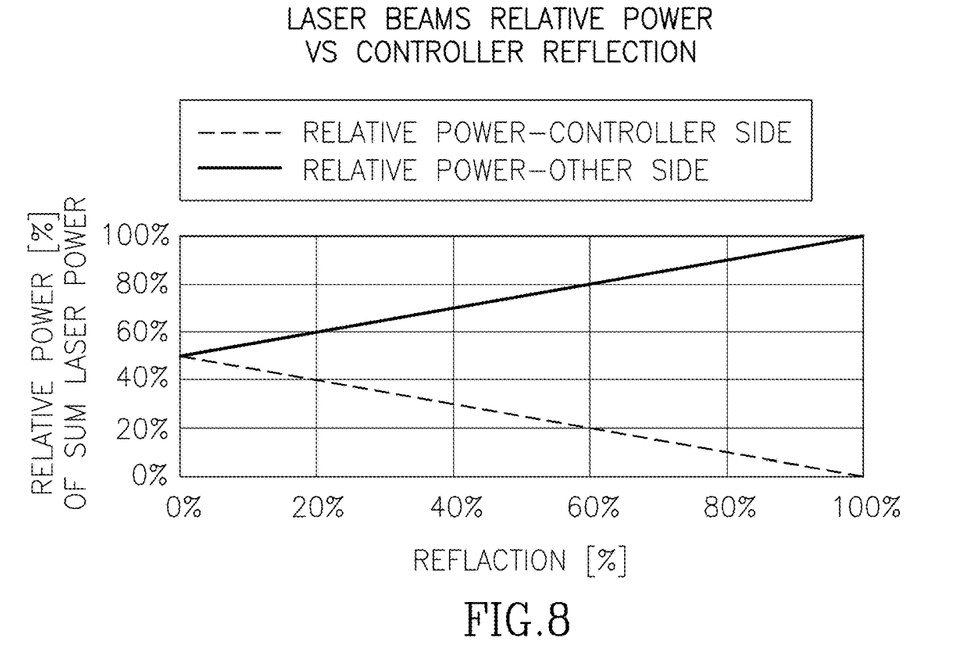
FIG. 8—illustrates Power behavior of the two beams as a function of the controlling device reflection coefficient.

In accordance with another embodiment, a controllable photonic device is installed next to one of the laser apertures, where this controllable photonic device is configured to adjust the amount of light emitted from that respective edge, e.g. by reflecting the rest of the light back into the laser. In this arrangement, optical power may be controllably divided between the two ends of the laser, and the ratio of power of the two patterns may be adjusted between equal power provided to both ends, to near-zero power provided for the pattern projected from the laser end where the controllable photonic device is installed. This option is exemplified in FIG. 8.

In another embodiment of the present invention, there are two controllable light-reflection devices as described above with reference to FIG. 8, each installed at a respective end of the laser device, wherein each of the two-controllable light-reflection devices is controlled separately from the other. By implementing such an arrangement, when the two reflection coefficients and the laser current are controlled, the optical power of each of the two projected patterns can be separately controlled, allowing all laser power capacity to be directed to any one of the patterns while the other is switched off, or alternatively have the power divided between the two ends of the laser at any desired ratio.

The solution provided by the present invention described hereinabove offers a number of advantages. Among which are:

1. A symmetric design enables coverage of a wide field of view ("FOV") by using a single projection module with a single laser device.
 2. Folding of the optical path enables to place the edge-emitting laser on the surface which is normal to the pattern propagation direction, which in turn provides two advantages:
    a. Small size
    b. Improved heat dissipation
 3. Excluding the DOE, this laser device of the present invention may be used as a very thin laser collimator, for any systems which utilize collimated lasers.
 4. Monolithic, low-cost design: three components may be manufactured within a single device, whereas in the symmetric case, six components may be manufactured as a single part, as exemplified in FIG. 9.
 5. Enabling projection of two patterns using a single device.
 6. Allowing division of power between two patterns, whether they overlap each other or not.

In summary, the projector provided by the present invention enables emitting light beams from both ends of the projector, rather than from one of its ends. Around each end, an arrangement of optical components is preferably aligned, in order to form a desired pattern out of the emitted beam. There is a large variety of possible arrangements of optical components, where each of these arrangements may serve a different application. In a specific arrangement, an optical component is designed, which can serve three functions simultaneously. When this component is placed at the laser aperture, a pattern may be produced by using only two components, the laser and the optical component. In case of a high-FOI projector, a laser unit (e.g. a laser chip) which emits light from both ends is chosen, and one such optical component is placed at each end of the laser symmetrically, so that each side is configured to project a pattern towards one part (out of two) of the FOI. This configuration enables reaching a FOI of up to twice the FOI of conventional projectors (e.g. 180 degrees), for example when dividing the required high FOI into two halves, and projecting a light pattern to each of these two halves by a different end of the laser unit.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. An optical collimating unit, comprising:
   a laser unit configured to emit an astigmatic light beam associated with fast axis and a slow axis, and
   a single lens having three non-parallel optical surfaces, being a first refractive surface of said single lens, a second reflective surface of said single lens and a third refractive surface of said single lens, wherein:
      the first refractive surface of said single lens is a toroidal aspheric surface configured to collimate the astigmatic light beam at least along the fast axis,
      the second reflective surface of said single lens is a flat surface configured to change direction of the astigmatic light beam, and
      the third refractive surface of said single lens is another curved surface configured to collimate the astigmatic light beam along at least the slow axis.

2. The optical collimating unit of claim 1, wherein any of the at least three optical surfaces of said single lens, is a member selected from a group that comprises a convex surface, a concave surface, a spherical surface, an aspherical surface, a bi-conic surface, a cylindrical surface, a toric surface or a freeform shape, and wherein the shape of the at least three surfaces is selected to enable controlling a shape and direction of a beam refracted by the lens.

3. The optical collimating unit of claim 1, further comprising an external reflective element attached thereto that enables emitting a light beam shaped to a desired cross-section distribution of phase and amplitude, thereby said emitted light beam is focused at a desired distance from said single lens.

4. The optical collimating unit of claim 1, wherein:
   the first refractive surface of said single lens is a toroidal aspheric surface configured to collimate the astigmatic light beam along the fast axis, and to diverge the astigmatic light beam along the slow axis.

5. A light projection device, comprising:
   at least one laser unit configured to emit an astigmatic light beam associated with fast axis and a slow axis;
   at least one lens each having three optical surfaces, being a first refractive surface of said one lens, a second reflective surface of said one lens and a third refractive surface of said one lens, the first refractive surface of said one lens is a toroidal aspheric surface configured to collimate the astigmatic light beam at least along the fast axis, the second reflective surface of said one lens is a flat surface configured to change direction of the astigmatic light beam, and the third refractive surface of said one lens is another curved surface configured to collimate the astigmatic light beam along at least the slow axis; and
   at least one optical component configured to shape the astigmatic light beam being emitted, into at least one desired light pattern.

6. The light projection device of claim 5, wherein said at least one optical component is selected from a group that consists of a phase-modulating component, a diffuser, and a microlens array (MLA).

7. The light projection device of claim 5, wherein said at least one optical component configured to shape emitted laser beams into respective desired light patterns, is implemented on one or more surface of the one lens.

8. A pattern projecting device, comprising:
   a laser diode unit having at least two separated apertures and configured to emit electromagnetic radiation simultaneously from the at least two separated apertures of said laser diode unit;
   a first lens opposing a first of the at least two separated apertures, wherein the first lens having three non-parallel optical surfaces, being a first toroidal aspheric refractive surface of said first lens, a second flat reflective surface of said first lens, and a third curved refractive surface of said first lens; and
   a second lens opposing a second of the at least two separated apertures, wherein the second lens having three non-parallel optical surfaces, being a fourth curved refractive surface of said second lens, a fifth flat reflective surface of said second lens and a sixth curved refractive surface of said second lens.

9. The pattern projecting device of claim 8, wherein said laser diode unit is an edge-emitting laser diode chip configured to emit electromagnetic radiation simultaneously from both ends of said laser diode chip.

10. The pattern projecting device of claim 9, further comprising optical collimating units each fixed next to a respective end of said laser diode.

11. The pattern projecting device of claim 8, comprising a plurality of surfaces each having a pre-defined curvature to enable collimating a fast axis and a slow axis of a light beam, and at least two microstructured components, each configured to generate a respective pattern out of a respective light beam that passes there-through.

12. The pattern projecting device of claim 11, wherein projected light patterns are at least partially overlapping each other.

13. The pattern projecting device of claim 11, wherein light patterns projected by said pattern projecting device are spatially combined to provide a wide field of illumination subtending a wide angle of at least 90° in one or two transverse dimensions.

14. An optical apparatus comprising a pair of controllable photonic devices that are associated with pattern projecting device of claim 11, wherein each of the pair of controllable photonic devices is configured to adjust power transmitted from a respective end of the laser diode unit of said pattern projecting device.

15. The pattern projecting device of claim 11, wherein the projected light patterns are different from each other.

16. The pattern projecting device of claim 11, further comprising:
   a controlling element configured to adjust the amount of light directed to at least one of the projected light patterns, wherein an adjustment of the amount of light is achieved by reflecting part of the emitted light through the respective aperture, back into the laser unit.

17. The pattern projecting device of claim 11, wherein optical power associated with the at least two light patterns, is adjustable in a range extending from providing an equal optical power to all projected light patterns derived from the electromagnetic radiation emitted simultaneously from the at least two separated apertures, to providing a near-zero optical power associated with one of said projected light patterns.

18. The pattern projecting device of claim 8, wherein:
- the first toroidal aspheric refractive surface of said first lens is configured to collimate the light beam emitted from the first of the at least two separated apertures along the fast axis;
- at least one of the second reflective surface of said first lens and the third refractive surface of said first lens is configured to collimate the light beam emitted from the first of the at least two separated apertures along the slow axis;
- the fourth refractive surface of said second lens is configured to collimate the light beam emitted from the second of the at least two separated apertures along the fast axis;
- at least one of the fifth reflective surface of said second lens and the sixth refractive surface of said second lens is configured to collimate the light beam emitted from the second of the at least two separated apertures along the slow axis.

* * * * *